US010025243B2

(12) United States Patent
Tamura

(10) Patent No.: US 10,025,243 B2
(45) Date of Patent: Jul. 17, 2018

(54) GEAR AND IMAGE FORMING APPARATUS PROVIDED WITH THE SAME

(71) Applicant: KYOCERA Document Solutions Inc., Osaka (JP)

(72) Inventor: Yuki Tamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/510,074

(22) PCT Filed: Aug. 17, 2016

(86) PCT No.: PCT/JP2016/073976
§ 371 (c)(1),
(2) Date: Mar. 9, 2017

(87) PCT Pub. No.: WO2017/056764
PCT Pub. Date: Apr. 6, 2017

(65) Prior Publication Data
US 2017/0299992 A1    Oct. 19, 2017

(30) Foreign Application Priority Data
Sep. 28, 2015   (JP) ................. 2015-190088

(51) Int. Cl.
G03G 15/00    (2006.01)
G03G 15/20    (2006.01)
F16H 55/17    (2006.01)

(52) U.S. Cl.
CPC ......... *G03G 15/2053* (2013.01); *F16H 55/17* (2013.01)

(58) Field of Classification Search
CPC .................. G03G 15/2053; F16H 55/17
USPC ........... 74/431, 434, 451, 460, DIG. 10; 425/542, 543, 556
See application file for complete search history.

(56) References Cited

U.S. PATENT DOCUMENTS

| | | | | |
|---|---|---|---|---|
| 6,070,484 A | * | 6/2000 | Sakamaki | B29D 15/00 264/328.1 |
| 7,155,995 B2 | * | 1/2007 | Ojima | B29C 45/0025 74/443 |
| 7,406,891 B2 | * | 8/2008 | Miyasaka | B29C 45/0025 425/542 |
| 8,028,598 B2 | * | 10/2011 | Hagihara | B29C 45/0025 74/431 |

(Continued)

FOREIGN PATENT DOCUMENTS

| | | | | |
|---|---|---|---|---|
| JP | 08025501 A | * | 1/1996 | ........ B29C 45/0046 |
| JP | 2003-28274 A | | 1/2003 | |
| JP | 2005-22368 A | | 1/2005 | |

*Primary Examiner* — Victor L MacArthur
(74) *Attorney, Agent, or Firm* — Stein IP, LLC

(57) ABSTRACT

A gear is provided that is capable of suppressing a decrease in strength at a weld line. The gear (40) is provided with a cylindrical boss (41) that is formed at a center portion, a rim (42) that is formed on an outer side in a radial direction of the boss concentrically with the boss and has a tooth portion (42a) at an outer circumferential portion thereof, and a web (43) that links the boss and the rim. In the web, a plurality of gate marks (43a) are formed. Furthermore, in the web, there are provided a plurality of first radial direction ribs (43b) that extend from the boss to the outer side in the radial direction along a weld line (40a) that appears between adjacent ones of the gate marks.

7 Claims, 5 Drawing Sheets

(56) References Cited

U.S. PATENT DOCUMENTS

| | | | | |
|---|---|---|---|---|
| 8,444,904 B2* | 5/2013 | Miyauchi | ................ | F16H 55/06 264/328.1 |
| 2003/0131678 A1* | 7/2003 | Noguchi | ............ | B29C 45/0046 74/434 |
| 2004/0043100 A1* | 3/2004 | Ojima | ................ | B29C 45/0025 425/542 |
| 2004/0241276 A1* | 12/2004 | Miyasaka | ........... | B29C 45/0025 425/543 |
| 2011/0024946 A1* | 2/2011 | Miyauchi | ................ | F16H 55/06 264/279 |
| 2014/0374212 A1* | 12/2014 | Tamura | .................. | F16D 41/00 192/41 R |
| 2015/0007680 A1* | 1/2015 | Hashimoto | ............. | F16H 55/06 74/434 |

* cited by examiner

GEAR AND IMAGE FORMING APPARATUS PROVIDED WITH THE SAME

CROSS-REFERENCE TO RELATED APPLICATIONS

This application is a national stage of International Application No. PCT/JP2016/073976, filed Aug. 17, 2016, which claims the benefit of priority to Japanese Application No. 2015-190088, filed Sep. 28, 2015, in the Japanese Patent Office, the disclosure of which are incorporated herein in their entireties by reference.

TECHNICAL FIELD

The present invention relates generally to a gear and an image forming apparatus provided with the same, and particularly to a resin gear injection-molded by using a mold in which a plurality of gates are provided and an image forming apparatus provided with the same.

BACKGROUND ART

Conventionally, in an image forming apparatus such as a copy machine, a printer, a facsimile, or the like, various types of rotary members are used. In order to cause such rotary members to rotate, it is required that a drive force be transmitted from a drive source such as a drive motor or the like to each of the rotary members, and to this end, a plurality of gears are used as a transmission member. As each of such gears, a resin gear is often used from the viewpoint of reductions in cost, noise, weight, and so on.

In a case of manufacturing a resin gear, as disclosed in, for example, Patent Document 1, generally, the gear is manufactured by injection molding using a mold in which a plurality of gates are disposed in a circumferential direction at an equal distance from each other.

LIST OF CITATIONS

Patent Literature

Patent Document 1: JP-A-2005-22368

SUMMARY OF THE INVENTION

Technical Problem

In a case, however, where a gear is manufactured by using a mold in which a plurality of gates are provided, batches of molten resin filled through the gates merge with each other at an intermediate position between the gates, resulting in generation of a weld line. At the weld line, strength is decreased, leading to a problem that the gear might be damaged when a load is applied thereto. Particularly when used in a high temperature state or under a high load, the gear is likely to be damaged. It is also likely that a crack is produced from a center portion side of the gear. Furthermore, depending on a type of a resin material used, a weld line is formed to be more conspicuous (a V-shaped groove formed on the weld line is formed in a larger size), so that strength is decreased to a greater degree.

The present invention has been made to solve the above-described problem and has as its object to provide a gear that is capable of suppressing a decrease in strength at a weld line and an image forming apparatus provided with the same.

Solution to the Problem

A gear according to a first aspect of the present invention is a resin gear provided with a cylindrical boss that is formed at a center portion, a rim that is formed on an outer side in a radial direction of the boss concentrically with the boss and has a tooth portion at an outer circumferential portion thereof, and a web that links the boss and the rim. In the web, on a surface thereof on one side in a thickness direction of the web, a plurality of gate marks are formed. Furthermore, in the web, a plurality of first radial direction ribs that extend from the boss to the outer side in the radial direction along a weld line that appears between adjacent ones of the gate marks are provided so as to protrude at least to the other side in the thickness direction of the web.

Advantageous Effects of the Invention

According to the gear of the first aspect of the present invention, in the web, the plurality of first radial direction ribs that extend from the boss to the outer side in the radial direction along a weld line that appears between adjacent ones of gate marks are provided so as to protrude at least to the other side in the thickness direction of the web. Thus, the web can be increased in thickness in a portion in which a weld line appears, so that a resin joining area along the weld line can be increased. As a result, it is possible to suppress a decrease in strength at a weld line of the gear and thus to suppress damage to the gear.

Still other objects of the present invention and specific advantages provided by the present invention will be made further apparent from the following description of an embodiment.

DESCRIPTION OF EMBODIMENTS

The following describes an embodiment of the present invention with reference to the appended drawings.

With reference to FIG. 1 to FIG. 8, a description is given of an image forming apparatus 100 provided with a gear 40 of one embodiment of the present invention.

In this embodiment, the image forming apparatus 100 (herein, a color printer) is a quadruple tandem type color printer in which four photosensitive drums (image carriers) 1a, 1b, 1c, and 1d corresponding to four different colors (yellow, cyan, magenta, and black) are disposed in parallel with each other and used for image formation.

Figure 1:
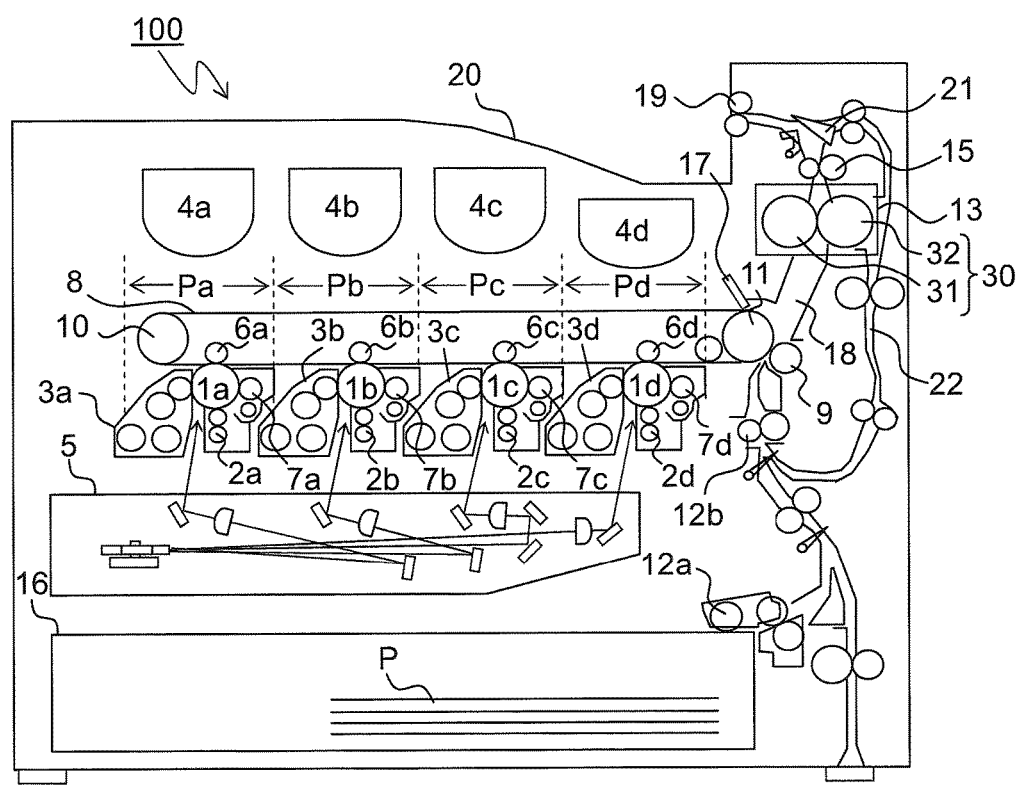
FIG. 1 is a sectional view schematically showing a structure of an image forming apparatus provided with a gear of one embodiment of the present invention.

In an apparatus main body of the image forming apparatus 100, four image forming portions Pa, Pb, Pc, and Pd are arranged in order from a left side in FIG. 1. The image forming portions Pa to Pd are provided so as to correspond to images of the four different colors (yellow, cyan, magenta, and black), respectively, and sequentially form, through respective processes of charging, exposure, developing, and transfer, images of yellow, cyan, magenta, and black, respectively.

In the image forming portions Pa to Pd, there are arranged the photosensitive drums 1a to 1d that carry visible images (toner images) of the respective colors, respectively, and an intermediate transfer belt 8 that rotates in a counterclockwise direction in FIG. 1 is provided adjacently to the image forming portions Pa to Pd. The toner images formed on the photosensitive drums 1a to 1d, after being sequentially transferred onto the intermediate transfer belt 8 moving while being in contact with the photosensitive drums 1a to 1d, are transferred once onto a paper sheet (sheet) P at a secondary transfer roller 9 and further are fixed, at a fixing device 13, on the paper sheet P as one example of a recording medium, after which the paper sheet P is ejected from the apparatus main body. While the photosensitive drums 1a to 1d are made to rotate in a clockwise direction in FIG. 1, an image forming process with respect to the photosensitive drums 1a to 1d is executed.

The paper sheet P onto which toner images are to be transferred is housed in a paper sheet cassette 16 in a lower portion of the apparatus and is conveyed to the secondary transfer roller 9 via a paper feed roller 12a and a registration roller pair 12b. As the intermediate transfer belt 8, a non-seamed (seamless) belt formed of a dielectric resin sheet is mainly used. By a belt drive motor (not shown), the intermediate transfer belt 8 and the secondary transfer roller 9 are driven to rotate at the same linear velocity as that of the photosensitive drums 1a to 1d. Furthermore, on a downstream side of the secondary transfer roller 9, a blade-shaped belt cleaner 17 for removing toner and so on remaining on a surface of the intermediate transfer belt 8 is disposed.

Next, a description is given of the image forming portions Pa to Pd. Around and below the photosensitive drums 1a to 1d that are rotatably arranged, there are provided charging devices 2a, 2b, 2c, and 2d that charge the photosensitive drums 1a to 1d, respectively, an exposure unit 5 that performs exposure based on image data with respect to the photosensitive drums 1a to 1d, developing units 3a, 3b, 3c, and 3d that develop, by using toner, electrostatic latent images formed on the photosensitive drums 1a to 1d, respectively, and cleaning devices 7a, 7b, 7c, and 7d that collect and remove a developer (toner) remaining on the photosensitive drums 1a to 1d after transfer of toner images, respectively.

Upon image data being inputted from a host apparatus such as a personal computer or the like, first, surfaces of the photosensitive drums 1a to 1d are uniformly charged by the charging devices 2a to 2d, respectively, and subsequently are irradiated by the exposure unit 5 with light based on image data, so that electrostatic latent images corresponding to the image data are formed on the photosensitive drums 1a to 1d, respectively. The developing units 3a to 3d are provided with developing rollers that are disposed opposite to the photosensitive drums 1a to 1d, respectively, and are filled with a prescribed quantity of two-component developer containing toner of the respective colors of yellow, cyan, magenta, and black, respectively.

In a case where, as a result of after-mentioned toner image formation, a percentage of the toner in the two-component developer filled in the developing units 3a to 3d falls below a set value, the developing units 3a to 3d are replenished with toner from toner containers 4a to 4d, respectively. By the developing units 3a to 3d, the toner is supplied on the photosensitive drums 1a to 1d, respectively, and electrostatically adheres thereto, so that toner images corresponding to the electrostatic latent images formed through exposure by the exposure unit 5 are formed thereon.

Then, by primary transfer rollers 6a to 6d, between the primary transfer rollers 6a to 6d and the photosensitive drums 1a to 1d, an electric field is applied at a prescribed transfer voltage to cause the toner images of yellow, cyan, magenta, and black on the photosensitive drums 1a to 1d to be primarily transferred onto the intermediate transfer belt 8. These images of the four colors are formed in a prescribed positional relationship preset for formation of a prescribed full-color image. After that, in preparation for succeeding formation of new electrostatic latent images, toner remaining on the surfaces of the photosensitive drums 1a to 1d is removed by the cleaning devices 7a to 7d, respectively.

The intermediate transfer belt 8 is laid across a driven roller 10 and a drive roller 11. When, as the drive roller 11 is driven to rotate by the above-described belt drive motor, the intermediate transfer belt 8 starts to rotate in the counterclockwise direction, at a prescribed timing, the paper sheet P is conveyed from the registration roller pair 12b to a nip portion (secondary transfer nip portion) between the secondary transfer roller 9 provided adjacently to the intermediate transfer belt 8 and the intermediate transfer belt 8, and at the nip portion, a full-color image is secondarily transferred onto the paper sheet P. The paper sheet P onto which the toner images have been transferred is conveyed to the fixing device 13.

By a fixing nip portion of a fixing roller pair 30 composed of a heating roller (heating rotary body) 31 and a pressing roller (pressing rotary body) 32, the paper sheet P conveyed to the fixing device 13 is, while being conveyed, heated and pressed so that the toner images are fixed on a surface of the paper sheet P to form the prescribed full-color image. The paper sheet P on which the full-color image has been formed passes through a conveyance roller pair 15, then a conveying direction of the paper sheet P is controlled by a bifurcation member 21 that is disposed at a bifurcation portion of a paper sheet conveyance path 18, and thus the paper sheet P is directly (or after being sent to a double-sided conveyance path 22 and subjected to double-sided copying there) ejected on an ejection tray 20 via an ejection roller pair 19.

To be specific, on a downstream side of the conveyance roller pair 15, the paper sheet conveyance path 18 bifurcates into two paths on the left and right, one of which (the path resulting from the bifurcation and extending in a left direction in FIG. 1) is configured to communicate with the ejection tray 20. Further, the other one of the paths (the path resulting from the bifurcation and extending in a right direction in FIG. 1) is configured to communicate with the double-sided conveyance path 22. In a case of forming an image on each of both surfaces of the paper sheet P, a part of the paper sheet P after having passed through the fixing device 13 is made to protrude once from the ejection roller pair 19 to an outside of the apparatus.

After that, while the ejection roller pair 19 is made to rotate reversely, the bifurcation member 21 is made to swing substantially horizontally, and thus the paper sheet P is guided along an upper surface of the bifurcation member 21 to the double-sided conveyance path 22 and is conveyed again, in a state where an image surface thereof is inverted, to the secondary transfer roller 9. Then, by the secondary transfer roller 9, next images formed on the intermediate transfer belt 8 are transferred on a surface of the paper sheet P on which no image has been formed yet, and the paper sheet P is then conveyed to the fixing device 13 where toner images formed thereon are fixed, after which the paper sheet P is ejected on the ejection tray 20.

Figure 2:
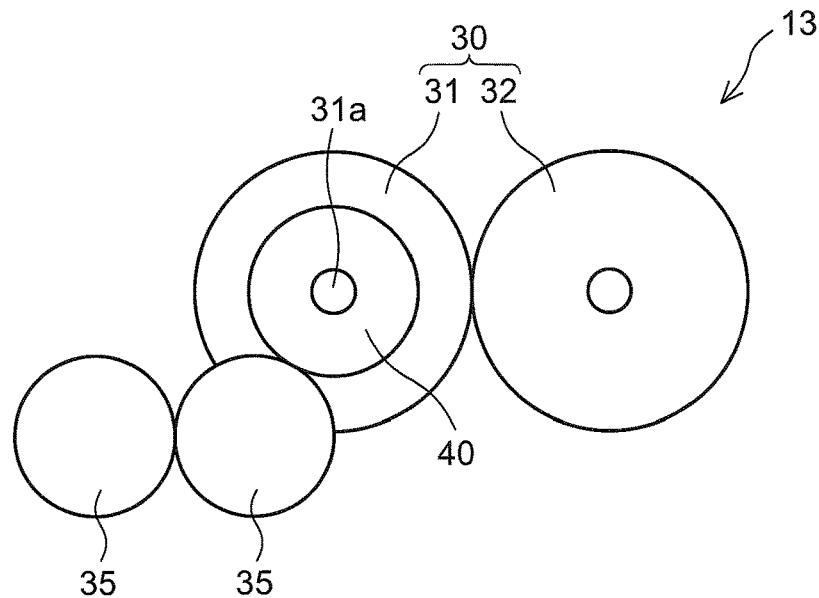
FIG. 2 is a diagram showing a structure of a periphery of a fixing roller pair of a fixing device in the image forming apparatus of the one embodiment of the present invention.

As shown in FIG. 2, the fixing device 13 includes the fixing roller pair 30 composed of the heating roller 31 and the pressing roller 32 and a pushing mechanism (not shown) that pushes the pressing roller 32 to the heating roller 31.

The heating roller 31 is formed of a so-called hard roller formed by applying a coating of a fluorine-based resin having excellent mold releasability, such as PFA (tetrafluoroethylene-perfluoroalkyl vinyl ether copolymer) or the like, on a cylindrical core bar made of a metal having excellent thermal conductivity, such as aluminum, iron, or the like, and an unshown heat source such as a halogen heater or the like is provided inside the core bar. Furthermore, at one end portion of a rotary shaft 31a of the heating roller 31, there is provided the gear 40 to which a rotational drive force from a drive motor (drive source) is inputted.

The pressing roller 32 is formed by forming an elastic layer of a silicone rubber or the like on a cylindrical base member made of a synthetic resin, a metal, or any other material and covering a surface of the elastic layer with a resin having excellent mold releasability, such as a fluorine-based resin or the like. By the pushing mechanism (not shown), the pressing roller 32 is brought into press-contact under a prescribed pressure with the heating roller 31, and rotates following rotation of the heating roller 31.

A drive force transmission train composed of a plurality of intermediate gears 35 that transmit a rotational drive force from the drive motor is connected to the gear 40.

Figure 3:
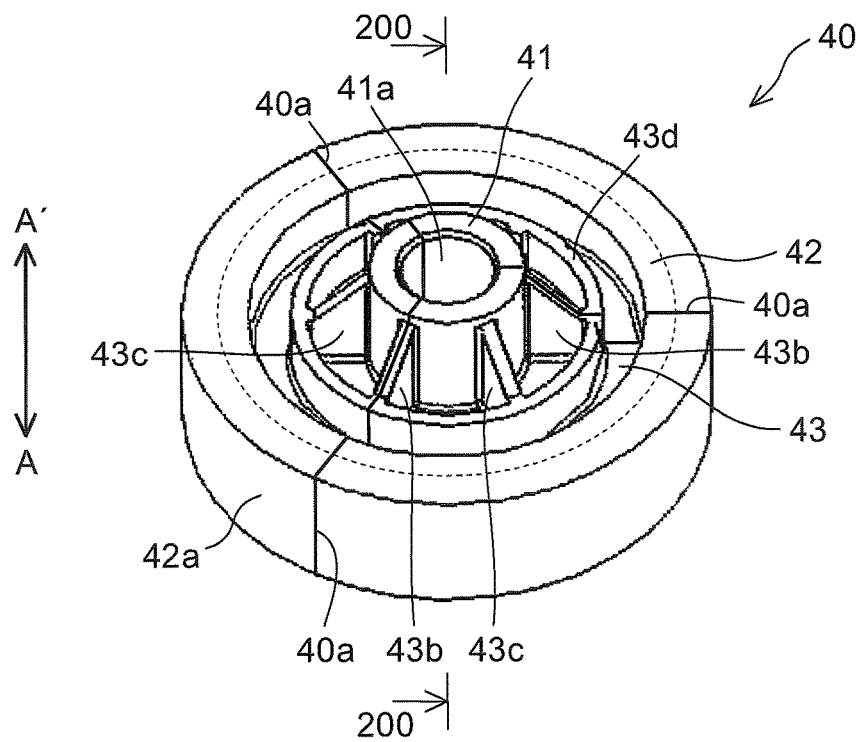
FIG. 3 is a perspective view showing, from an arrow A' direction side, a structure of the gear of the one embodiment of the present invention.
Figure 4:
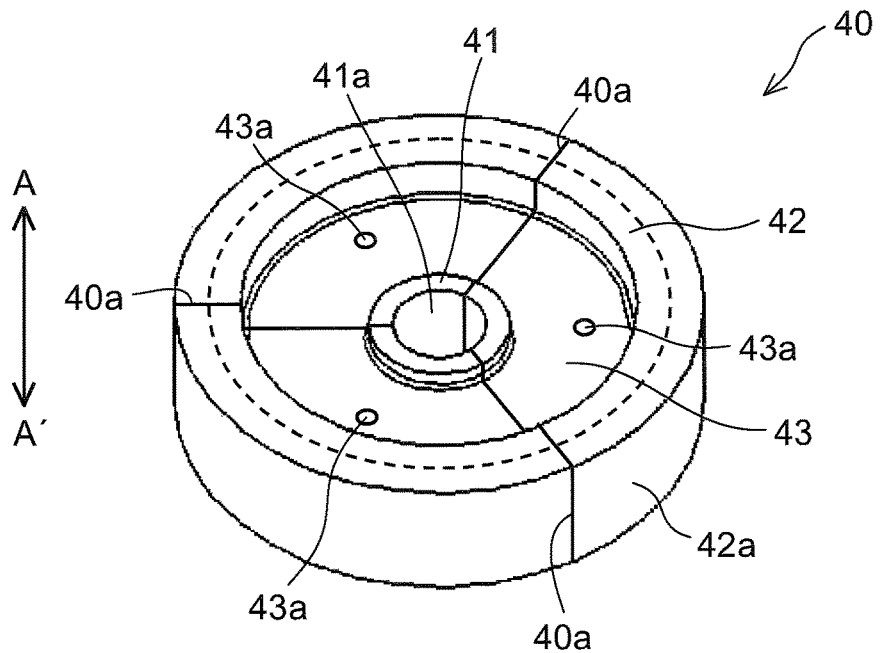
FIG. 4 is a perspective view showing, from an arrow A direction side, the structure of the gear of the one embodiment of the present invention.
Figure 5:
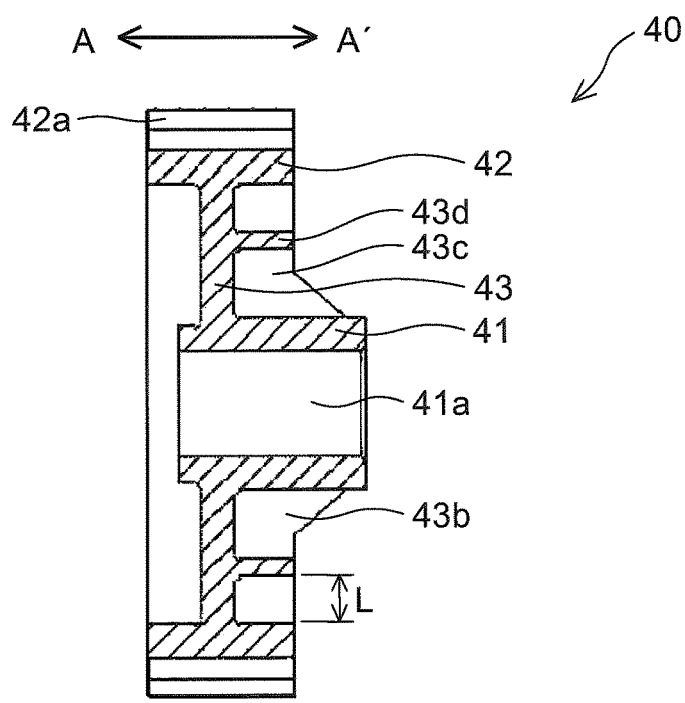
FIG. 5 is a sectional view along line 200-200 in FIG. 3.

From the viewpoint of, for example, flame retardancy, the gear 40 is formed by injection molding of a resin such as PPS (polyphenylene sulfide) or the like. As shown in FIG. 3 to FIG. 5, the gear 40 is composed of a cylindrical boss 41 that is formed at a center portion, a rim 42 that is formed on an outer side in a radial direction of the boss 41 concentrically with the boss 41, and a web 43 that links the boss 41 and the rim 42 together.

At a center of the boss 41, there is formed a through hole 41a into which the rotary shaft 31a of the heating roller 31 is to be inserted.

The rim 42 is formed so as to protrude to both sides in a thickness direction (an arrow AA' direction) of the web 43 with respect to the web 43. At an outer circumferential portion of the rim 42, there is formed a tooth portion 42a that is to be engaged with the intermediate gears 35.

Figure 6:
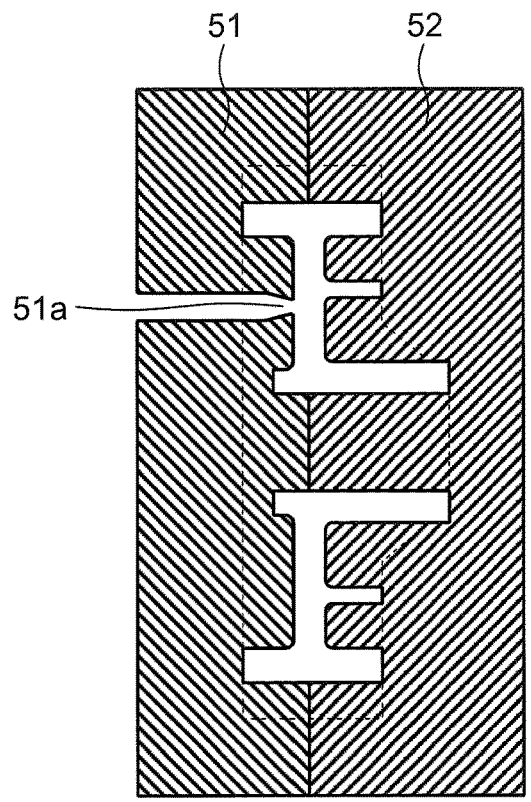
FIG. 6 is a sectional view showing structures of a cavity mold and a core mold that are molds for molding the gear of the one embodiment of the present invention.

In the web 43, on a surface thereof on one side (an arrow A direction) in the thickness direction of the web 43, a plurality (herein, three) of gate marks 43a (see FIG. 4) are formed. As shown in FIG. 6, the gate marks 43a are marks formed when, in a case of manufacturing the gear 40 by using a cavity mold 51 and a core mold 52, the gear 40 is formed by filling a resin material through a gate 51a that is a resin material injection port of the cavity mold 51 and then is taken out from the cavity mold 51. In this embodiment, since a plurality (herein, three) of the gates 51a are provided in a circumferential direction at an equal distance (about 120° apart) from each other, as shown in FIG. 7 and FIG. 8, the gate marks 43a are formed in the circumferential direction around the boss 41 at an equal distance (about 120° apart) from each other.

Consequently, in the gear 40 (the boss 41, the web 43, and the rim 42), a plurality (herein, three) of weld lines 40a are formed at intermediate positions between adjacent ones of the gate marks 43a, respectively.

Figure 7:
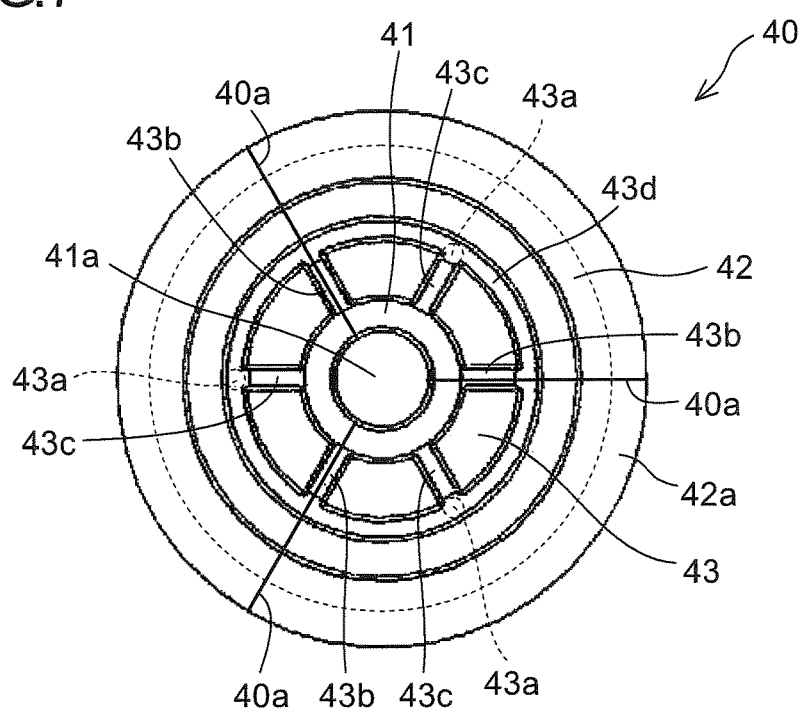
FIG. 7 is a diagram showing, from an arrow A' direction, the structure of the gear of the one embodiment of the present invention.
Figure 8:
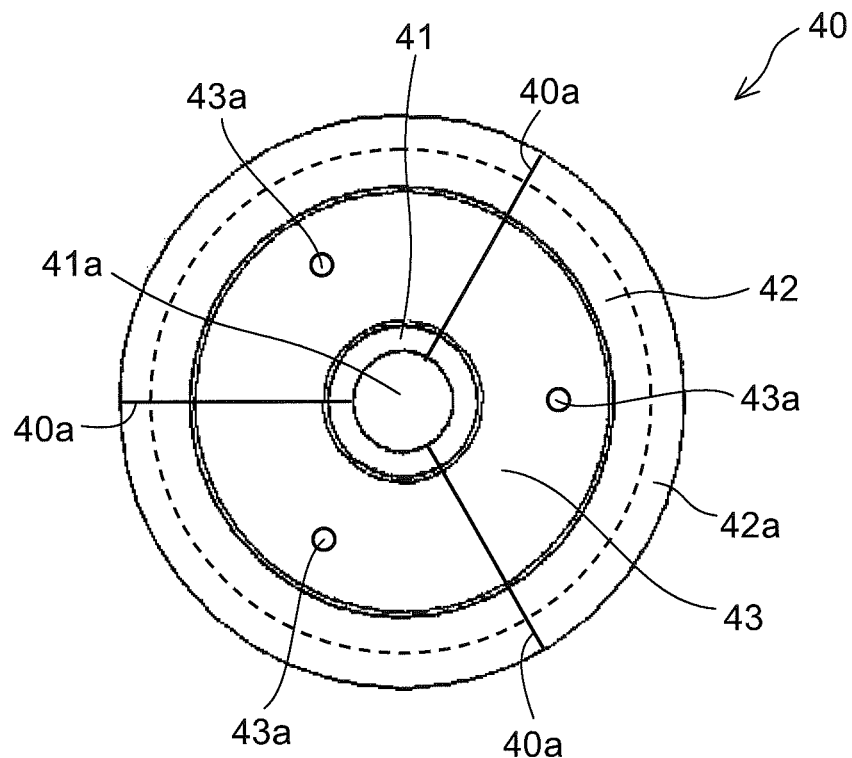
FIG. 8 is a diagram showing, from an arrow A direction, the structure of the gear of the one embodiment of the present invention.

Here, in this embodiment, as shown in FIG. 3 and FIG. 7, at portions of the web 43 in which the weld lines 40a appear, there are formed a plurality (herein, three) of first radial direction ribs 43b that extend from the boss 41 to an outer side in a radial direction along the weld lines 40a. The first radial direction ribs 43b are provided so as to protrude to the other side (an arrow A' direction) in the thickness direction of the web 43. Furthermore, the first radial direction ribs 43b are formed so that a length (a protrusion amount) thereof in the thickness direction (the arrow AA' direction) of the web 43 increases with increasing proximity to the boss 41.

Furthermore, in the web 43, a plurality (herein, three) of second radial direction ribs 43c that extend from the boss 41 to the outer side in the radial direction are formed so as to overlap with the plurality of gate marks 43a when seen from the thickness direction of the web 43. Similarly to the first radial direction ribs 43b, the second radial direction ribs 43c are provided so as to protrude to the other side (the arrow A' direction) in the thickness direction of the web 43 and are formed so that a length (a protrusion amount) thereof in the thickness direction (the arrow AA' direction) of the web 43 increases with increasing proximity to the boss 41.

Furthermore, in the web 43, a circumferential direction rib 43d that is concentric with the boss 41 is formed so as to overlap with the plurality of gate marks 43a when seen from the thickness direction of the web 43. The circumferential direction rib 43d is provided so as to protrude to the other side (the arrow A' direction) in the thickness direction of the web 43. Furthermore, the circumferential direction rib 43d is formed at a distance of 2 mm or more (a distance L in FIG. 5) from the rim 42.

Furthermore, the first radial direction ribs 43b and the second radial direction ribs 43c are formed to extend from the boss 41 to the circumferential direction rib 43d and not formed outward of the circumferential direction rib 43b in the radial direction.

In this embodiment, as described above, in the web 43, there are provided the plurality of first radial direction ribs 43b that extend from the boss 41 to the outer side in the radial direction along the weld lines 40a. Thus, the web 43 can be increased in thickness in the portions in which the weld lines 40a appear, so that a resin joining area along each of the weld lines 40a can be increased. As a result, it is possible to suppress a decrease in strength at the weld lines 40a of the gear 40 and thus to suppress damage to the gear 40.

Furthermore, as described above, in the web 43, the circumferential direction rib 43d that is concentric with the boss 41 is provided so as to overlap with the plurality of gate marks 43a when seen from the thickness direction of the web 43. Thus, at the time of injection molding, molten resin can be caused to flow around quickly in the circumferential direction, and thus batches of resin can be joined together before the resin decreases in temperature. It is, therefore, possible to further suppress a decrease in strength at the weld lines 40a of the gear 40.

Furthermore, as described above, the first radial direction ribs 43b are formed to extend from the boss 41 to the circumferential direction rib 43d and not formed outward of the circumferential direction rib 43d in the radial direction. Thus, when a resin material shrinks in curing, it is possible to suppress an influence of shrinkage of the first radial direction ribs 43b on the rim 42. That is, it is possible to suppress a phenomenon in which portions of the rim 42 that are opposed to the first radial direction ribs 43b are pulled by first radial direction ribs 43b to cause a distortion. It is, therefore, possible to suppress a decrease in dimensional accuracy of the tooth portion 42a.

Furthermore, as described above, the circumferential direction rib 43d is formed at a distance of 2 mm or more from the rim 42. Thus, when a resin material shrinks in curing, it is possible to further suppress an influence of shrinkage of the first radial direction ribs 43b on the rim 42 and thus to further suppress a decrease in dimensional accuracy of the tooth portion 42a.

Furthermore, as described above, in the web 43, the plurality of second radial direction ribs 43c that extend from the boss 41 to the outer side in the radial direction are provided so as to overlap with the plurality of gate marks 43a when seen from the thickness direction of the web 43. Thus, at the time of injection molding, molten resin can be filled quickly in a direction toward the center (a direction toward the boss 41), so that batches of resin in a neighborhood of the center portion (the boss 41) can be joined together before the resin decreases in temperature. It is, therefore, possible to suppress a decrease in strength at the weld lines 40a in the neighborhood of the center portion (the boss 41). When a load is applied to the gear 40, it is likely that a crack is produced from a center portion side of the gear 40. By suppressing, however, a decrease in strength at the weld lines 40a in the neighborhood of the center portion, it is possible to effectively suppress damage to the gear 40.

Furthermore, as described above, the first radial direction ribs 43b are formed so that a length thereof in the thickness direction of the web 43 increases with increasing proximity to the boss 41. Thus, a resin joining area along each of the weld lines 40a in the neighborhood of the center portion (the boss 41) can be increased further, so that it is possible to further suppress a decrease in strength at the weld lines 40a in the neighborhood of the center portion (the boss 41). It is, therefore, possible to more effectively suppress damage to the gear 40.

Furthermore, as described above, a drive force is transmitted to the fixing roller pair 30 via the gear 40. It is likely that a periphery of the fixing roller pair 30 is heated to a high temperature, so that the gear is likely to be damaged due to a decrease in strength at the weld lines. Furthermore, from the viewpoint of flame retardancy or the like, there is a limitation on a type of a resin material that can be used for the gear 40, and in a case of using, for example, PPS, weld lines are formed to be more conspicuous (a V-shaped groove formed on each of the weld lines is formed in a larger size), so that strength is decreased to a greater degree. Accordingly, it is particularly effective to apply the present invention to the gear for transmitting a drive force to the fixing roller pair 30.

The embodiment disclosed herein is to be construed in all respects as illustrative and not limiting. The scope of the present invention is indicated by the appended claims rather than by the foregoing description of the embodiment, and all changes that come within the meaning and range of equivalency of the claims are intended to be embraced therein.

For example, while the foregoing has shown an example in which the present invention is applied to a color printer, the present invention is not limited thereto. Needless to say, the present invention can be applied to various types of image forming apparatuses each provided with a resin gear, such as a monochrome printer, a color copy machine, a monochrome copy machine, a digital multi-functional peripheral, a facsimile, and so on.

Furthermore, while the above-described embodiment has shown an example in which the present invention is applied to the gear 40 that transmits a drive force to the fixing roller pair 30, the present invention may be applied also to a gear that transmits a drive force to a roller or the like other than the fixing roller pair 30.

Figure 9:
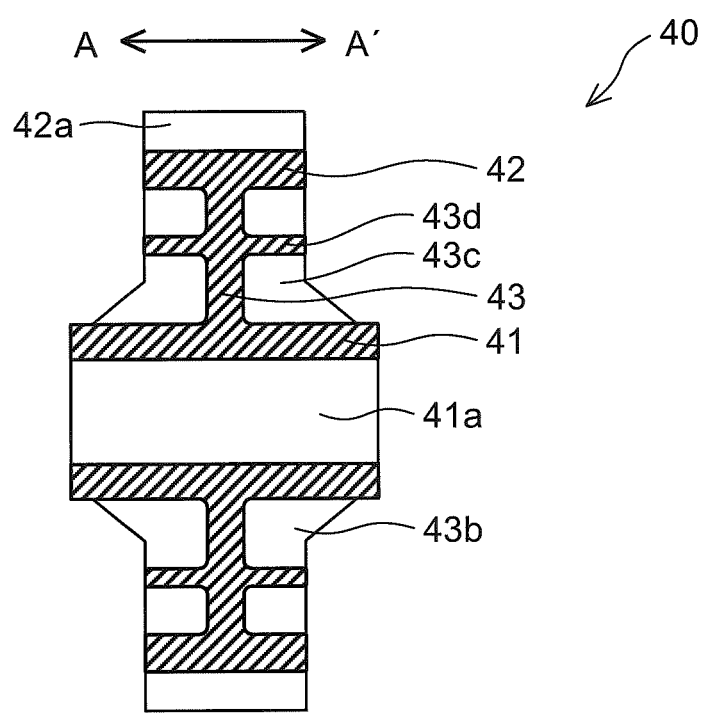
FIG. 9 is a sectional view showing a structure of a gear as a modification example of the present invention.

Furthermore, while the above-described embodiment has shown an example in which the first radial direction ribs 43b, the second radial direction ribs 43c, and the circumferential direction rib 43d are provided so as to protrude only to the other side (the arrow A' direction) in the thickness direction of the web 43, for example, as in a gear 40 as a modification example of the present invention shown in FIG. 9, the first radial direction ribs 43b, the second radial direction ribs 43c, and the circumferential direction rib 43d may be provided so as to protrude to the both sides (the arrow AA' direction) in the thickness direction of the web 43.

The invention claimed is:
1. A gear made of a resin, comprising:
 a cylindrical boss that is formed at a center portion of the gear;
 a rim that is formed radially outside of the boss and concentric with the boss and has a tooth portion at an outer circumferential portion of the rim; and
 a web that links the boss and the rim,
 wherein
 in the web,
 a plurality of gate marks are formed on a surface of the web at one side of the web in a thickness direction of the web, and
 a plurality of first radial direction ribs that extend from the boss toward a radially inner surface of the rim along a weld line that appears between adjacent ones of the gate marks are provided so as to protrude at least toward an other side of the web in the thickness direction; and
 a plurality of second radial direction ribs that extend from the boss toward the radially inner surface of the rim are provided so as to overlap with the plurality of gate marks when seen from the thickness direction of the web and so as to protrude at least toward the other side of the web in the thickness direction.

2. The gear according to claim 1, wherein
 in the web, a circumferential direction rib that is concentric with the boss is provided so as to overlap with the plurality of gate marks when seen from the thickness direction of the web and so as to protrude at least toward the other side of the web in the thickness direction.

3. The gear according to claim 2, wherein
 the first radial direction ribs are formed to extend from the boss to the circumferential direction rib and not formed radially outside of the circumferential direction rib, and
 the second radial direction ribs are formed to extend from the boss to the circumferential direction rib and not formed radially outside of the circumferential direction rib.

4. The gear according to claim 3, wherein
the circumferential direction rib is formed at a distance of 2 mm or more from the rim.

5. The gear according to claim 1, wherein
the first radial direction ribs are formed so that a length of the first radial direction ribs of the first radial direction ribs in the thickness direction of the web increases with increasing proximity to the boss.

6. An image forming apparatus comprising the gear according to claim 1.

7. The image forming apparatus according to claim 6, further comprising:
a fixing device that includes a fixing roller pair that heats and presses a recording medium so that an unfixed toner image on the recording medium is fixed thereon, wherein a drive force is transmitted to the fixing roller pair via the gear.

* * * * *